US008750799B2

(12) United States Patent
Giles et al.

(10) Patent No.: US 8,750,799 B2
(45) Date of Patent: *Jun. 10, 2014

(54) WIRELESS ACCESSORY DEVICE PAIRING DETERMINATION FOR MULTIPLE HOST DEVICES

(75) Inventors: Michael J. Giles, San Jose, CA (US); Jack I-Chieh Fu, San Mateo, CA (US); Clifford J. Hunt, Half Moon Bay, CA (US); Michael A. Cretella, Jr., San Francisco, CA (US)

(73) Assignee: Apple Inc., Cupertino, CA (US)

( * ) Notice: Subject to any disclaimer, the term of this patent is extended or adjusted under 35 U.S.C. 154(b) by 425 days.

This patent is subject to a terminal disclaimer.

(21) Appl. No.: 12/895,662

(22) Filed: Sep. 30, 2010

(65) Prior Publication Data
US 2012/0083209 A1    Apr. 5, 2012

(51) Int. Cl.
*H04B 7/00* (2006.01)
*G06F 3/00* (2006.01)

(52) U.S. Cl.
USPC ........................................................ 455/41.2

(58) Field of Classification Search
USPC ................................. 455/41.2, 420
See application file for complete search history.

(56) References Cited

U.S. PATENT DOCUMENTS

| | | | |
|---|---|---|---|
| 6,564,275 B1 * | 5/2003 | Chen | 710/107 |
| 6,708,228 B1 * | 3/2004 | Meyers et al. | 710/5 |
| 7,215,649 B2 | 5/2007 | Yu et al. | |
| 7,730,152 B2 * | 6/2010 | Zhuang et al. | 709/208 |
| 7,894,796 B2 * | 2/2011 | Karaoguz et al. | 455/411 |
| 7,907,901 B1 * | 3/2011 | Kahn et al. | 455/41.2 |
| 2002/0044131 A1 * | 4/2002 | Benayoun et al. | 345/156 |
| 2002/0052182 A1 | 5/2002 | Mayuzumi | |
| 2003/0092437 A1 | 5/2003 | Nowlin et al. | |
| 2003/0109273 A1 | 6/2003 | Ono et al. | |
| 2004/0014526 A1 * | 1/2004 | Kulas | 463/43 |
| 2004/0150615 A1 | 8/2004 | Lee | |
| 2004/0162027 A1 | 8/2004 | Chang | |

(Continued)

FOREIGN PATENT DOCUMENTS

KR   100664211   12/2006
WO   WO 2009/027770   3/2009

OTHER PUBLICATIONS

International Search Report dated Oct. 21, 2011, for PCT Application No. PCT/US2011/046142.

(Continued)

*Primary Examiner* — Gennadiy Tsvey
(74) *Attorney, Agent, or Firm* — Park, Vaughan, Fleming & Dowler LLP

(57) ABSTRACT

A wireless communications system includes an accessory device and multiple host devices. A host device pairs wirelessly with an accessory device using a unique link key, detects a primary trigger event and responds by transferring automatically its pairing with the accessory device to a second host device while all devices remain within wireless range of each other. The pairing transfer involves communicating the link key to the second host device, unpairing the accessory device from the first host device, and establishing a wireless pairing of the accessory device to the second host device. The primary trigger event can involve establishing a ported connection between host devices. A secondary trigger event results in the first host device automatically reclaiming its pairing with the accessory device. An accessory device can also select and pair with one of multiple host devices in response to a specific user gesture detected by the accessory device.

7 Claims, 9 Drawing Sheets

(56) References Cited

U.S. PATENT DOCUMENTS

| | | |
|---|---|---|
| 2005/0065768 A1* | 3/2005 | Karaoguz et al. ............... 703/27 |
| 2005/0065769 A1 | 3/2005 | Karaoguz et al. |
| 2005/0065770 A1* | 3/2005 | Karaoguz et al. ............... 703/27 |
| 2007/0098002 A1* | 5/2007 | Liu et al. ....................... 370/422 |
| 2007/0249383 A1* | 10/2007 | Wiklof et al. ................. 455/522 |
| 2007/0264991 A1 | 11/2007 | Jones et al. |
| 2008/0005262 A1 | 1/2008 | Wurzburg et al. |
| 2008/0227393 A1 | 9/2008 | Tang et al. |
| 2008/0320190 A1* | 12/2008 | Lydon et al. .................. 710/106 |
| 2009/0017799 A1* | 1/2009 | Thorn ........................ 455/414.1 |
| 2010/0303236 A1 | 12/2010 | Laaksonen et al. |
| 2011/0003548 A1* | 1/2011 | Malcolmson ................ 455/41.2 |
| 2011/0081923 A1* | 4/2011 | Forutanpour et al. ......... 455/457 |
| 2011/0099384 A1* | 4/2011 | Grange et al. ................. 713/184 |
| 2011/0151788 A1* | 6/2011 | Castrogiovanni et al. ... 455/41.2 |

OTHER PUBLICATIONS

Written Opinion dated Oct. 21, 2011 for PCT Application No. PCT/US2011/046142.

* cited by examiner

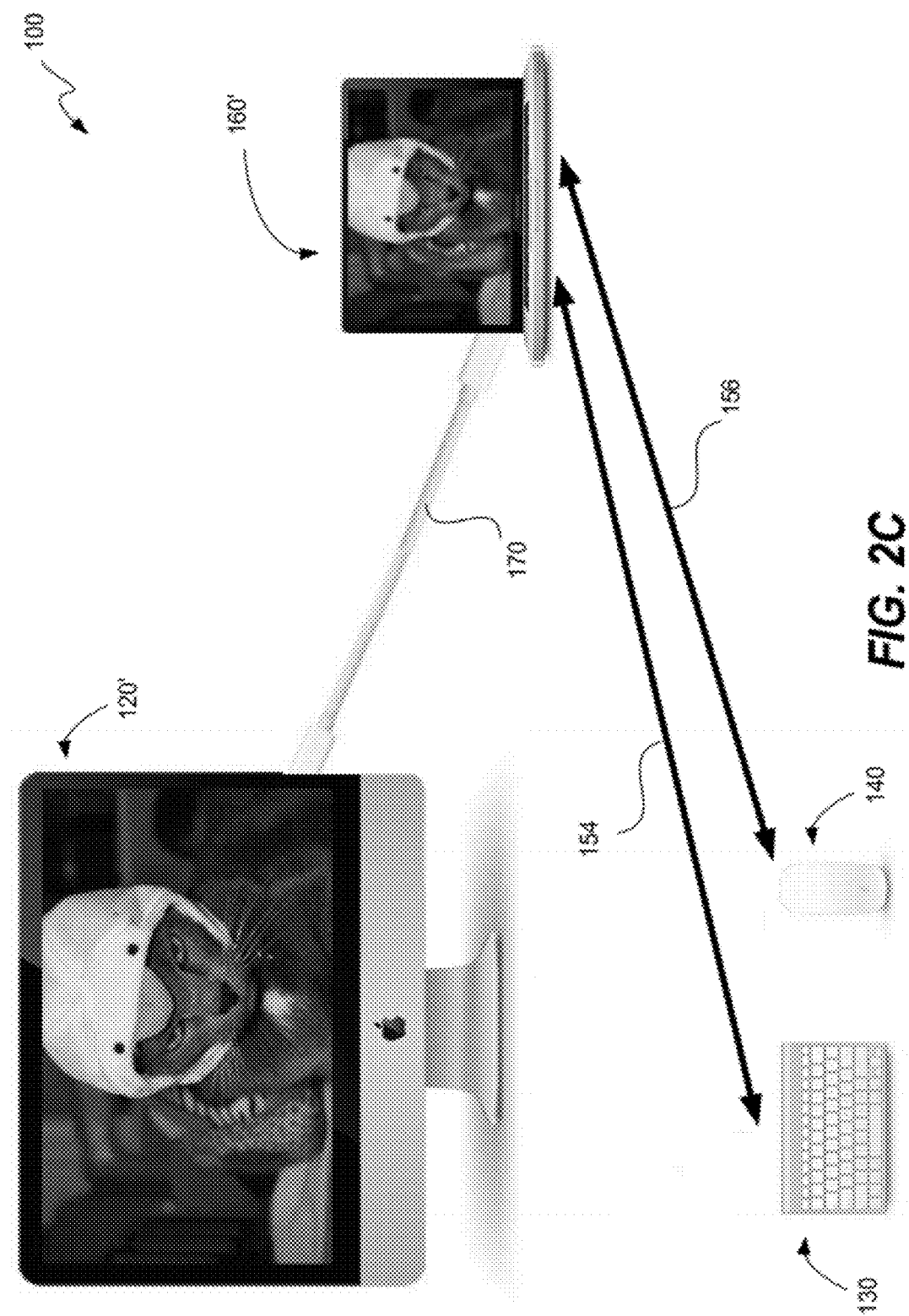

WIRELESS ACCESSORY DEVICE PAIRING DETERMINATION FOR MULTIPLE HOST DEVICES

CROSS-REFERENCE TO RELATED APPLICATIONS

This application relates to U.S. patent application Ser. No. 12/895,607, entitled "WIRELESS ACCESSORY DEVICE PAIRING TRANSFER BETWEEN MULTIPLE HOST DEVICES," filed concurrently by Giles et al. as inventors, which is incorporated by reference herein in its entirety and for all purposes.

TECHNICAL FIELD

The present invention relates generally to wireless communications, and more particularly to the pairing of accessory devices to host devices for conducting wireless communications.

BACKGROUND

Recent advances in technology have resulted in a proliferation of computers, electronic devices and associated accessories and peripherals that are adapted to link up with and communicate with each other. While many links and communications between such devices and accessories take place over wired connections, such links and communications between devices are increasingly taking place wirelessly. Examples of "host" devices for such wireless communications can include personal computers, cellular telephones, laptops, tablet computers and the like, while examples of "accessory" or peripheral devices can include headphones, wireless earpieces, keyboards, mice, printers, various other human interface ("HI") devices and the like. The ability for such devices to communicate wirelessly presents numerous advantages and conveniences to users and consumers, such that increases in the amount of wireless communications between devices in the future are inevitable.

One process that is ubiquitous in such wireless communications arrangements is the bonding or pairing of devices. Pairing is a process that is used to associate a wireless accessory or peripheral device with a wireless host device. The pairing ensures that the data being transferred is not only secured but is also being transferred between appropriate devices. For example, a particular pairing can be used to associate a given headset or earpiece with a particular mobile phone, and vice versa. Another example can include the pairing of a wireless keyboard and wireless mouse to a particular computer or other host device. The pairing provides for secure data transfer between the devices, typically through use of encryption.

Although pairing can sometimes requires that a pin code or other identifier be entered manually by a user in order to pair a host device with an accessory device, many pairings between devices now use more streamlined processes, such as the Secure Simple Pairing protocol that is required by Bluetooth v2.1 and later devices. Such cases can involve "just works" type of devices, such as earpieces for cellular telephones or wireless mice and keyboards for computers, among others. In other circumstances, it is possible that a user need not enter a pin code or take other action because a proprietary exchange of information can also facilitate pairing. In such instances, it is often sufficient for a wireless accessory device simply to enter into range of a wireless host to which it can be paired. Such streamlined processes result in a more convenient and user friendly experience for many users and consumers.

In many such simplified cases, a wireless accessory device that is not paired with a host device is put into a "search" mode, whereby it actively searches for a host device with which to pair. The pairing process is then typically triggered automatically the first time the accessory device comes into range of, finds and requests to pair with a suitable host device. During the pairing process, the two devices involved establish a relationship by creating a shared secret or link key. Once a unique link key is stored by both devices, they then become paired. A device that wants to communicate only with a paired device can cryptographically authenticate the identity of the other device so as to be sure that it is the same device with which it has previously paired. Once a link key has been generated, an authenticated link between the devices may be encrypted so that the data that they exchange over the airwaves is protected against eavesdropping or other unauthorized communications.

Once a pairing has been established it is remembered by the devices, which then connect to each other without further user intervention. In fact, a pairing of wireless devices often remains for significant periods of time, even indefinitely. When desired, the pairing relationship can later be terminated manually by the user. In addition, the removal of one of the devices from the wireless range of the other can also facilitate the termination of a pairing relationship. In such instances, link keys can be deleted at any time by either device. If done by either device this will implicitly remove the pairing between the devices.

Unfortunately, the facilitation of pairing between wireless devices has become so streamlined that the unpairing of paired devices can be troublesome in some cases. This often occurs where a particular accessory device is a simplified device with no display or readily understandable process for unpairing. In such instances, transferring a pairing to another host device or any other unpairing of the accessory device from its currently paired host can require separating the devices until they are out of range with each other for some time, such that the simpler accessory device eventually goes into search mode again for another host device. Other inconvenient solutions to invoke a changed pairing of a wireless accessory device can include turning off one or more devices or excessive manual intervention into the unpairing and reassigning of a new pairing for the accessory device.

While many designs and techniques used to provide pairings between wireless host and accessory devices have generally worked well in the past, there is always a desire to provide improvements in such wireless systems and pairing methods. In particular, what is desired are systems and methods that permit the easy transfer of pairings from one wireless host device to another, as well as permit the ready selection of a wireless host device from multiple present and possible host devices for a particular wireless accessory device.

SUMMARY

It is an advantage of the present invention to provide the easy transfer of pairings from one wireless host device to another, as well as permit the ready selection of a wireless host device from multiple present and possible host devices for a particular wireless accessory device. This can be accomplished at least in part through the use of wireless host devices adapted to recognize trigger events and transfer pairings with wireless accessory devices to appropriate other host devices. In addition, wireless accessory devices can be adapted to recognize simple gestures and inputs, and to pair with the correct host device in response to a gesture or input and its associated identifier stored at the accessory device.

In various embodiments, a wireless communications system can include an accessory device adapted to pair wirelessly with another device in order to conduct wireless communications therewith, a first host device adapted to pair wirelessly with the accessory device, and a second host device adapted to pair wirelessly with the accessory device and communicate with the first host device. The initial pairing between the accessory device and first host device can involve the generation of a unique link key between the first host device and accessory device. The first host device can be adapted to detect a primary trigger event and respond by transferring automatically its pairing with the accessory device to the second host device while the accessory device and both host devices all remain within wireless communication range of each other. Further embodiments can include one or more additional accessory devices adapted to pair with the first host device and have the pairing transferred to the second host device in a similar manner. In some embodiments, such transfer of multiple accessory devices between the first and second host devices can occur simultaneously.

In various detailed embodiments, the pairing transfer can include the first host device communicating the unique link key to the second host device. The first host device can retain a copy of the unique link key after communicating the unique link key to the second host device, and in some cases the accessory device can be adapted to recognize the first host device as its default host device. Further, the first host device can be adapted to detect a secondary trigger event and respond by reclaiming automatically its pairing with the accessory device. The accessory devices and host devices can all be Bluetooth devices, although other types of paired wireless communications may also be used. In various embodiments, the primary trigger event can be the creation of a wired connection from the second host device to the first host device, such as a porting connection, while other arrangements can result in the primary trigger event involving a wireless communication from the second host device to the first host device. Further trigger events are also possible.

In various embodiments, methods of transferring a pairing between wireless devices can include the steps of establishing a wireless pairing of an accessory device to a first host device, detecting a primary trigger event at the first host device, the primary trigger event involving the presence of a second host device within wireless pairing range of the first accessory device, sending pairing information for the accessory device from the first host device to the second host device in response to the primary trigger event, and transferring pairing control of the first accessory device from the first host device to the second host device using the received pairing information. Such transferring can occur while the first host device and second host device both remain within wireless communications or even pairing range of the first accessory device, and transferring can include unpairing the first accessory device from the first host device, and establishing a wireless pairing of the accessory device to the second host device. Again, the pairing information can include a link key that is unique to the accessory device, and the primary trigger event can include the creation of a wired connection from the second host device to the first host device. Transferring can involve unpairing the accessory device from the first host device, or could alternatively involve disconnecting while retaining the pairing information between devices so as to facilitate the ready future re-pairing of devices.

In various detailed embodiments, further steps can include establishing a wireless pairing of a second accessory device to the first host device, also sending pairing information for the second accessory device from the first host device to the second host device in response to the primary trigger event, and transferring pairing control of the second accessory device from the first host device to the second host device using the received pairing information for the second accessory device. Further steps can also include detecting a secondary trigger event at the first host device, and transferring pairing control of the accessory device from the second host device back to the first host device in response to the secondary trigger event. Again, such pairing transfers can occur while all involved devices remain within wireless communications range or pairing range of each other.

In further additional embodiments, a wireless communications system can include multiple host devices adapted to pair wirelessly with one or more accessory devices, and also one or more accessory device located within wireless pairing range of all host devices and adapted to pair with any of the host devices. At least one accessory device is adapted to select and pair with one of the host devices in response to a specific user gesture detected by the accessory device, with the pairing involving the generation of a unique link key for the accessory device. One or more additional accessory devices located within wireless pairing range of all host devices can also be adapted to pair with any host device, and such second, third or further accessory devices can be adapted to select and pair with one of the host devices in response to a specific second, third or further user gesture detected by the second, third or further accessory device. In some embodiments, the user gestures are the same, and the multiple accessory devices are adapted to pair to the same host device in response to the same user gesture detected by both or all of the accessory devices. Such multiple pairing of accessory devices to the same host device can occur simultaneously.

In various detailed embodiments, an accessory device includes an internal memory having data regarding each of the multiple host devices and specific user gestures for each stored thereon. The internal memory includes a list of multiple known host devices with which the accessory device is able to pair and a different user gesture associated with each separate host device on the list. In some embodiments, at least one of the host devices is adapted to retain a copy of a unique link associated with an accessory device even when the respective accessory device is not linked thereto. In some embodiments, an accessory device is adapted to recognize a particular host device as its default host device. Again, the accessory devices and host devices can all be Bluetooth devices, although other types of paired wireless communications may also be used. In various embodiments, a user gesture can be a button push, an audible sound, a hand motion or an acceleration of the first accessory device detectable by an internal accelerometer, among other possibilities.

In yet further additional embodiments, methods of selecting a pairing automatically for a wireless accessory device to one of a plurality of possible host devices can include the steps of maintaining in a memory of a wireless accessory device a list of multiple known host devices with which the accessory device is able to pair, associating a different user gesture input with each separate known host device in the list, detecting a first user gesture input by the accessory device, and establishing automatically a wireless pairing of the accessory device to a first host device associated with the detected first user gesture input in response to detecting the first user gesture. Such establishing can occur while the first host device and one or more other host devices are all within wireless communications range of the accessory device. Such establishing can include exchanging pairing information between the accessory device and the first host device, with the pairing information including a link key that is unique to the accessory device.

In various further detailed embodiments, additional method steps can include detecting a second user gesture input by the accessory device while the accessory device is paired with the first host device, and switching automatically the pairing of the accessory device from the first host device to a second host device associated with the second user gesture in response to detecting the second user gesture. Such switching can occur while the first host device and second host devices are both within wireless communications range of the accessory device. Such switching can include unpairing the accessory device from the first host device and establishing a wireless pairing of the accessory device to the second host device. Again, switching can involve unpairing the accessory device from the first host device, or could alternatively involve disconnecting while retaining the pairing information between devices so as to facilitate the ready future re-pairing of devices. Still further method steps can include detecting a repeated first user gesture input by the accessory device, said repeated first gesture occurring shortly after the initial first user gesture, and selecting the first host device to pair with from a plurality of possible host devices based on the number of times the first user gesture is repeated. The number of times the first user gesture input is repeated can be the different user gesture input associated with each separate known host device in the list.

Still further embodiments can include non-transitory computer readable medium for storing computer code executable by a processor at a first host device for transferring a pairing between wireless devices, including computer code for performing each of the steps in the foregoing methods.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and arrangements for the disclosed inventive systems and methods for transferring and determining device pairings between wireless devices. These drawings in no way limit any changes in form and detail that may be made to the invention by one skilled in the art without departing from the spirit and scope of the invention.

FIG. 2C illustrates in front facing view an exemplary resulting pairing arrangement with a second host device after the exemplary trigger event of FIG. 2B according to one embodiment of the present invention.

DETAILED DESCRIPTION

Figure 1A:
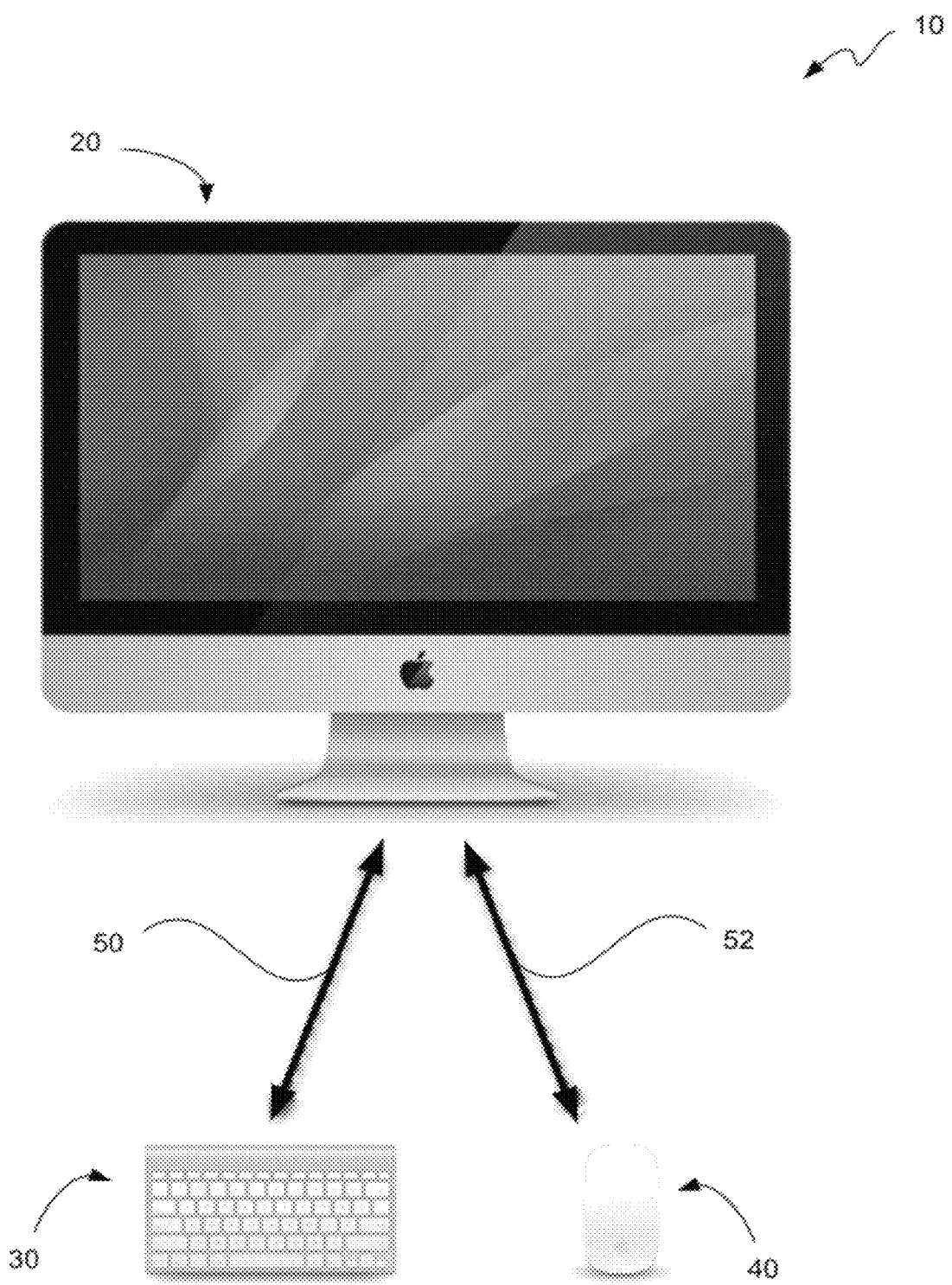
FIG. 1A illustrates in front facing view an exemplary wireless system having a host device and two accessory devices.

Exemplary applications of apparatuses and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting; such that other embodiments may be used, and changes may be made without departing from the spirit and scope of the invention.

The invention relates in various embodiments to the pairing of wireless devices, such as accessory or peripheral devices to host devices. A wide variety of devices can function as accessory devices, with non-limiting examples including headphones, earpieces, keyboards, mice, printers, pointers, game controllers and the like. Similarly, a wide variety of devices can function as host devices, with non-limiting examples including personal computers, cellular telephones, laptops, tablet computers, game consoles and the like. In various instances, a typical host type device can also function as an accessory device to another host device. Numerous other examples of accessory and host devices exist, and it will be understood that such other arrangements can be arranged to practice the various systems and methods provided herein.

In addition, various types of wireless communications and protocols can be used for the systems and methods provided herein. Such varying types of wireless communications preferably involve the ability of accessory and host devices to pair for the purpose of dedicated wireless communications between devices. Although the specific examples provided herein are discussed with respect to Bluetooth wireless communications, it will be understood that any other suitable form of wireless communications between paired devices can be used. Furthermore, although the detailed examples set forth herein frequently refer to pairing that occurs within wireless or pairing range of a new host, it is also possible for such a pairing to occur over a bonjour/LAN or other suitable connection that is not within wireless range. For example, pairing data can be transmitted to a remote device over a bonjour/LAN connection, with the accessory device then connecting up and running with the new host as paired once it does come into range of the new host. Other variations from the specific embodiments illustrated herein will also be appreciated by those of skill in the art, and all such variations may be included.

The following detailed description generally sets forth various device pairing structures and techniques, followed by paired host device transfer, and finishing with paired host device selection. These general subjects are set forth in greater detail below.

Device Pairing

Turning first to FIG. 1A, an exemplary wireless system having a host device and two accessory devices is shown in front facing view. Wireless system 10 can include a host device 20, which can be, for example, a desktop computer among various other possible host devices. Various accessory devices paired with host device 20 can include a wireless keyboard 30 paired by wireless connection or link 50 and a wireless mouse 40 paired by wireless connection or link 52. It will be readily appreciated that additional wireless accessory devices may also be simultaneously paired with host device 20, and that other types of wireless accessory devices may be used. In one embodiment, the wireless connections can be local Bluetooth connections, although again other types of wireless connections can be used.

As noted above, wireless links 50, 52 can be established by way of a standard pairing process between accessory devices 30, 40 and the host device 20. Such a pairing process typically results in the generation of a unique link key for each wireless link 50, 52. Assuming that pairing has been successful between a wireless host device and a wireless accessory device, thereafter, data transfer can be performed between the wireless host device and the wireless accessory device in a secured and controlled manner through use of the link key that was established during the pairing operation. When paired, an accessory device 30, 40 is typically responsive to only the host device 20. Hence, if there are other host devices in the vicinity of the accessory device 30, 40, then the accessory device understands to ignore wireless communications from such other host devices. In contrast, when unpaired, an accessory device 30, 40 can be responsive to any compatible host devices in the vicinity. The host device 20 can generally also be paired with more than one accessory device.

Figure 1B:
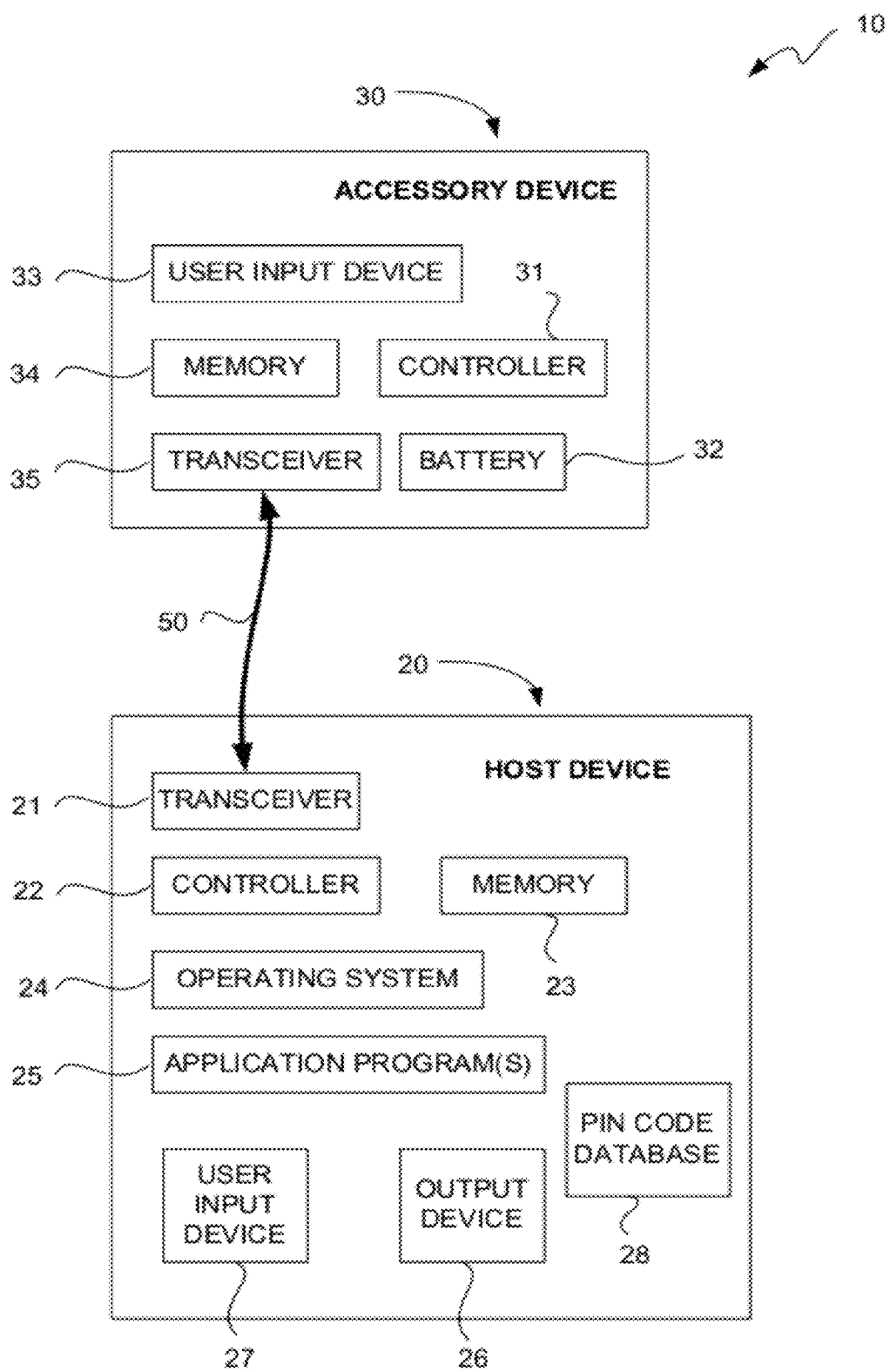
FIG. 1B illustrates in block diagram format the exemplary wireless host device and one wireless accessory device of FIG. 1A.

Continuing with FIG. 1B, the exemplary wireless host device and one wireless accessory device of FIG. 1A are shown in block diagram format. Again, wireless system 10 can include a host device 20 and a wireless accessory device 30. The wireless accessory device can include a processor or controller 31 and power source, such as a battery 32. A user input 33 coupled to the controller 31 may be adapted to aid in pairing with a host device, although the presence of such a user input is not ultimately necessary in all cases. As an example, the user input 33 can include a button that enables a user to place the accessory device 30 into a pairing mode. A memory 34 can also be coupled to the controller 31 and provide persistent data storage for various elements associated with the accessory device, including program code, identifier(s), data structures, and the like. Still further, the accessory device 30 includes a transceiver 35. In one embodiment, the transceiver 35 is a radio-frequency (RF) transceiver. The transceiver 35 can output a wireless transmission that is directed toward the host device 20, such as over link 50.

The host device 20 also includes a transceiver 21 for the wireless transmissions over link 50. The host device 20 further includes at least a controller 22, a memory 23, an operating system 24, application program(s) 25, an output device 26 and a user input device 27. The controller 22 controls the overall operation of the host device 20. The memory 23 can be used to store persistent data, including program code (e.g., for the operating system 24 and the application program(s) 25), identifier(s), data structures, and the like. The operating system 24 together with the controller 22 enables the host device 20 to not only wirelessly receive transmissions from the accessory device 30, but to also support and operate one or more application programs 25 as well as to utilize the output device 26 and the user input device 27. The host device 20 can also include a pin code database 28. The pin code database 28 can store a plurality of pin codes associated with different manufacturers, device types, and so forth. During pairing, the host device 20 can attempt to pair using one or more of the pin codes stored in the pin code database 28. Although the pin code database 28 is shown as a separate component, it should be noted that the pin code database 28 can be stored in the memory 23.

Again, it will be readily appreciated that the foregoing details are merely exemplary in nature, and that numerous arrangements and configurations for wireless devices and pairings thereof can be used. For example, the host device can be a laptop, tablet computer or game console, while the accessory device can be any user input device, such as a wireless joystick or other game controller. In addition, the host device can be one device in a network of devices, such as on a LAN or WAN, including the Internet. In some cases, multiple host devices can be connected on the same LAN or WAN. Additional items may also be included in one or both of the host and accessory devices, with inputs also including a touchscreen and voice recognition as well as outputs also including visual displays, speakers, tactile feedback and the like. Various forms of user friendly pairing, such as the Secure Simple Pairing protocol of Bluetooth v2.1 and other similar protocols may be used. Any and all such items, arrangements and protocols for wireless pairing of accessory devices to host devices can be used with the various systems and methods set forth below, as will be readily appreciated.

Paired Host Device Transfer

In many situations, a user can have a single set of wireless accessory devices, but may wish to use them on two or more different host devices. As one particular non-limiting example, a desktop computer can be paired to a wireless keyboard and wireless mouse. A display cable can then be used to port the display of a laptop computer to the larger desktop computer for a temporary process. The laptop display is then properly reflected on the desktop computer display. The wireless keyboard and mouse, however, are still paired with the desktop computer and do not transfer over to the laptop. The user is then forced to either use the keyboard and mouse built into the laptop, resort to further wireless accessory or peripheral devices, or remove the laptop, keyboard and mouse from the presence of the desktop computer and wait for a repairing of these devices, any of which are inconvenient.

Under such a remote or transferred display mode, one host device can effectively be a docking station, mirror or slave for another host device. In this particular example, the desktop computer (i.e., first host device) is effectively a remote display or docking station for the laptop computer (i.e., second host device). Of course, numerous other situations and arrangements involving multiple host devices are also possible, many of which may share the common problem that a user friendly and often temporary transfer of pairings of wireless accessory devices from one host device to another host device is desired.

Figure 2A:
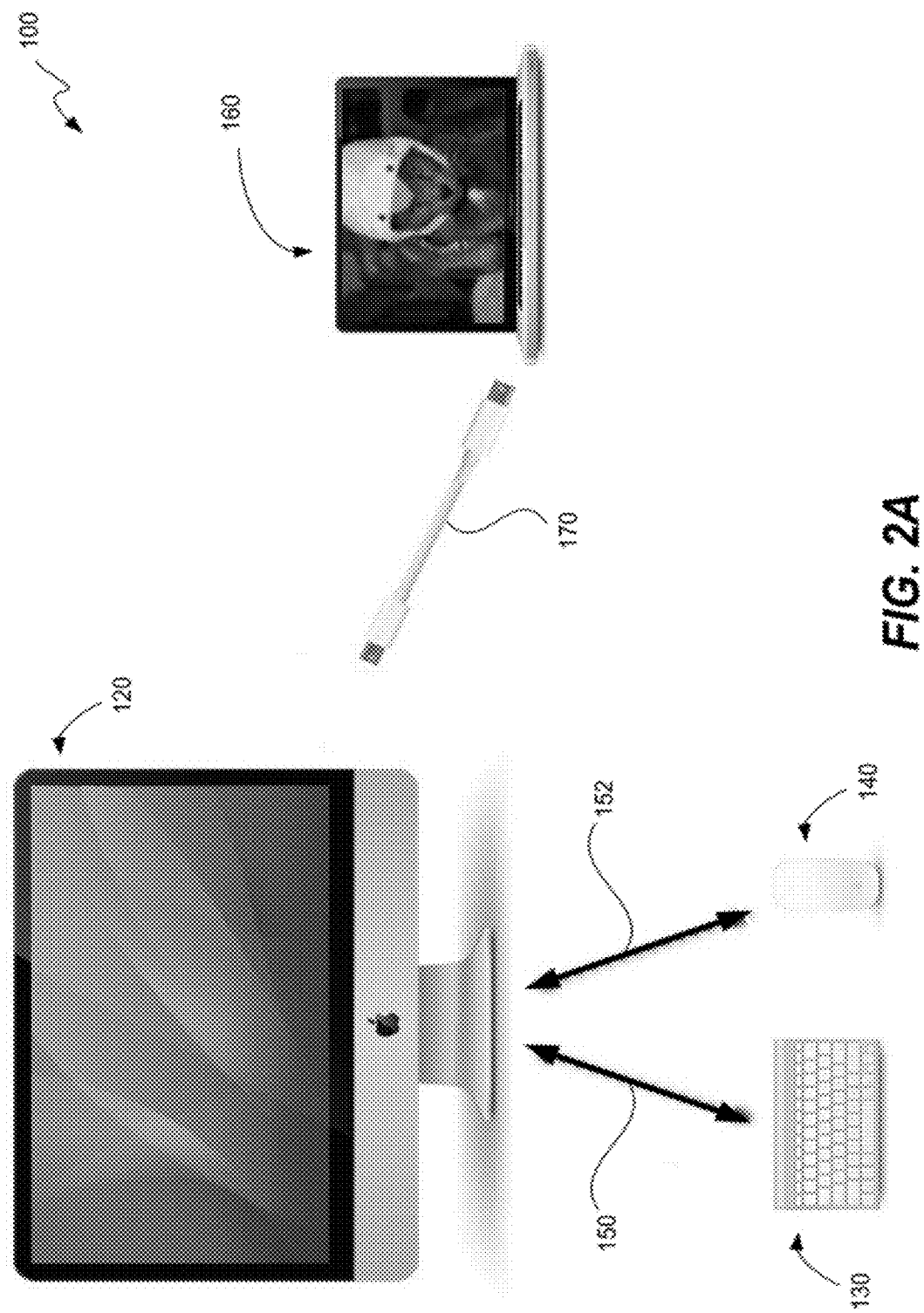
FIG. 2A illustrates in front facing view an exemplary system having multiple host devices and multiple accessory devices paired with a first host device according to one embodiment of the present invention.

Turning next to FIG. 2A an exemplary system having multiple host devices and multiple accessory devices paired with a first host device according to one embodiment of the present invention is illustrated in front facing view. Similar to the foregoing system 10 of FIG. 1A, a wireless communications system 100 can include a first host device 120, such as a desktop computer, and one or more accessory devices 130, 140, such as a keyboard and a mouse. Wireless keyboard 130 can be paired with first host device 120 by way of wireless link 150, while wireless mouse 140 can be paired with the first host device by way of wireless link 152. In addition, a second host device 160, such as a laptop computer, can be introduced into the vicinity of the first host device 120 and accessory devices 130, 140. Ordinarily, the accessory devices 130, 140 will ignore the second host device 160, since they are already paired to the first host device 120.

Figure 2B:
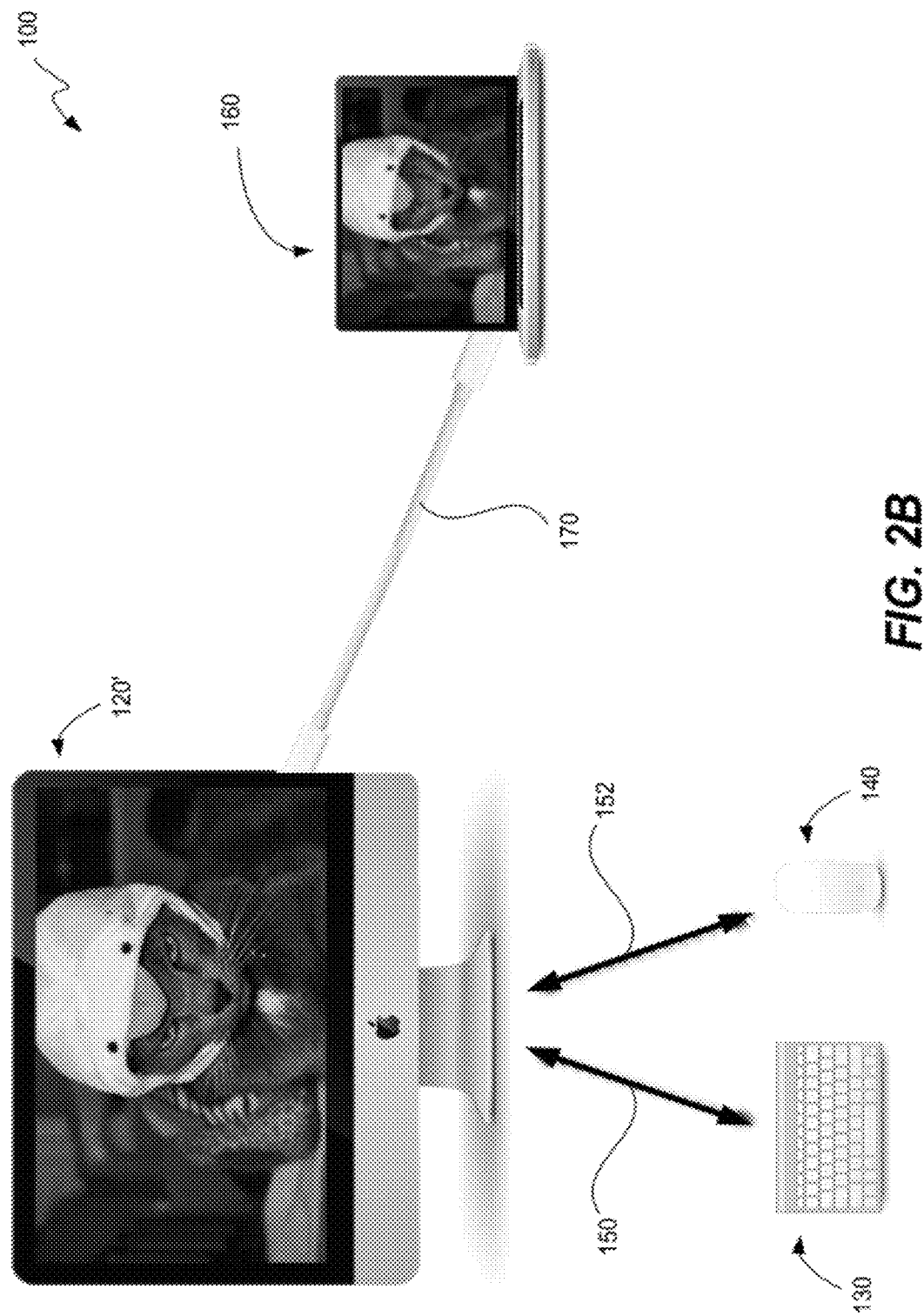
FIG. 2B illustrates in front facing view an exemplary trigger event in the exemplary system of FIG. 2A according to one embodiment of the present invention.

In certain circumstances, however, a specific "trigger event" can initiate an automatic process of transferring the pairing of accessory devices 130, 140 from their current host device 120 to the second host device 160. One example of such a trigger event can involve the use of a display cable 170, such as between host devices. As such, FIG. 2B illustrates in front facing view an exemplary primary rigger event in the exemplary system of FIG. 2A. That is, display cable is connected to ports at both host devices, such that a display from second host device 160 is shown on a display of now transformed first host device 120'. Again, the introduction of a hard link, such as a display cable, between host devices results in the first host device effectively becoming a remote display or docking station for the second host device. The first host device can be configured such that a trigger event such as the introduction of a display cable 170 thereto results in the automatic transfer of its pairings with wireless accessory devices 130, 140 to the second host device 160 to which it is now linked Moving now to FIG. 2C, an exemplary resulting pairing arrangement with a second host device after the exemplary primary trigger event of FIG. 2B is similarly shown in front facing view. Wireless communications system 100 still includes wireless accessory devices 130, 140, as well as transformed first host device 120', transformed second host device 160' and display cable 170 linking the host devices. Unlike the prior versions shown in FIGS. 2A and 2B, however, the wireless accessory devices pairings have been transferred to transformed second host device 160'. The host devices are transformed at least to the extent that first host device 120' no longer controls or pairs with the accessory devices 130, 140, while second host device 160' is paired with the accessory devices. In addition, the first host device is a display for the second host device, at least in this example. Wireless keyboard 130 is thus paired to second host device 160' by new wireless link 154, while the wireless mouse 140 is paired to the second host device by wireless link 156.

While such a primary trigger event can be the establishment of a new wired connection between host devices, such as display cable 170, numerous other types of trigger events can similarly result in the automated transfer of pairings to accessory devices. For example, the establishment of a separate wireless link between host devices can also trigger the transfer of wireless pairings. In addition, a particular communication between host devices along an already established communication line can also be a primary trigger event. Other trigger events can include, for example, a simple button push, a specific user gesture, the newly introduced presence of a "higher priority" or more important host device within the vicinity of an accessory device, or another state change in the first host device that indicates that a second host device is preferable, among other possibilities.

These new pairing configurations for wireless accessory devices 130, 140 can be the result of several steps that take place once a trigger event is detected. One significant step is that the first host device can communicate to the second host device information associated with the accessory device to be transferred. Such information can include the unique link key, a specific address (e.g., a Bluetooth Device Address) and possibly a pin code for the accessory device. This communication of a link key, specific device address and pin code between host devices can be repeated for each separate accessory device that is to have its pairing transferred between host devices. In some embodiments, the first host device 120 can retain a copy of these data items with respect to the wireless accessory devices 130, 140 to be transferred, such that the first host device can be readily paired with these accessory devices again later. Again, while such a paired host transfer can take place while all devices are within wireless range of each other, it is also possible for such a pairing transfer to occur over a bonjour/LAN or other suitable connection that is not within wireless range, such as by transferring the appropriate data over a wired connection to a remote device, whereby the newly paired devices can be paired and up and running as soon as they do enter into wireless range of each other.

The first host device can then unpair or otherwise cancel its pairing with the accessory device or devices to be transferred, which canceling can then put those devices into a normal pairing mode. Alternatively, pairing information between the first host device and accessory device can be maintained while the devices are simply disconnected from each other in a "inactive" manner that causes the accessory device to seek out a new host for an active pairing. While in pairing mode, an unpaired accessory device will then find the second host device, which also now happens to hold the unique link key for pairing with the accessory device. The accessory device then requests information about the second host device for pairing, and the second host device may request further information from the accessory device. For example, a pin code for the accessory device may be communicated at this time, rather than previously when the first host device sent information regarding the accessory device to the second host device. Pairing then takes place between the accessory device and second host device. Such transferred pairings can take place with little to no input on the part of a user, and can be automated in response to a particular trigger event.

In various embodiments, the accessory device can include a memory that maintains a list of different hosts with which it can connect, as well as respective pairing information for each such host. In addition, one or more accessory devices can be configured to recognize a particular host device as a "default" host device for that accessory device. In some cases, the default host device can be one specific host device, while in other cases, the last host device to which the accessory device has paired can be considered the default host device for that accessory device.

A secondary trigger event can then result in another transfer of pairings for the wireless accessory devices or devices. Such another transfer can involve a pairing to yet a third host device, or can result in a reversion back to pairing with the original or first host device. In the illustrative example provided here, such a secondary trigger event can be the disconnection of display cable 170, whereupon the pairings of accessory devices 130, 140 can then revert back from the second host device 160 to the first host device 120. Upon a disconnection of a display cable or other suitable secondary trigger event, the second host device 160 can tell each accessory device 130, 140 to switch back to the first host device 120.

Again, such a process can involve the second host device 160 canceling its pairings with the wireless accessory devices 130, 140, such as by instructing each accessory device to unpair or disconnect with it. Such an unpairing or disconnection can put an affected accessory device back into pairing mode, whereupon it can either find the first host device anew, or revert to its most recent previous host pairing, or to a default host pairing, as may be desired. Such different results can be configured for each device as may be preferable, such that the actual pairing and transferring processes can advantageously take place quickly and with little to no user involvement upon the recognition of an appropriate trigger event or events.

Figure 3:
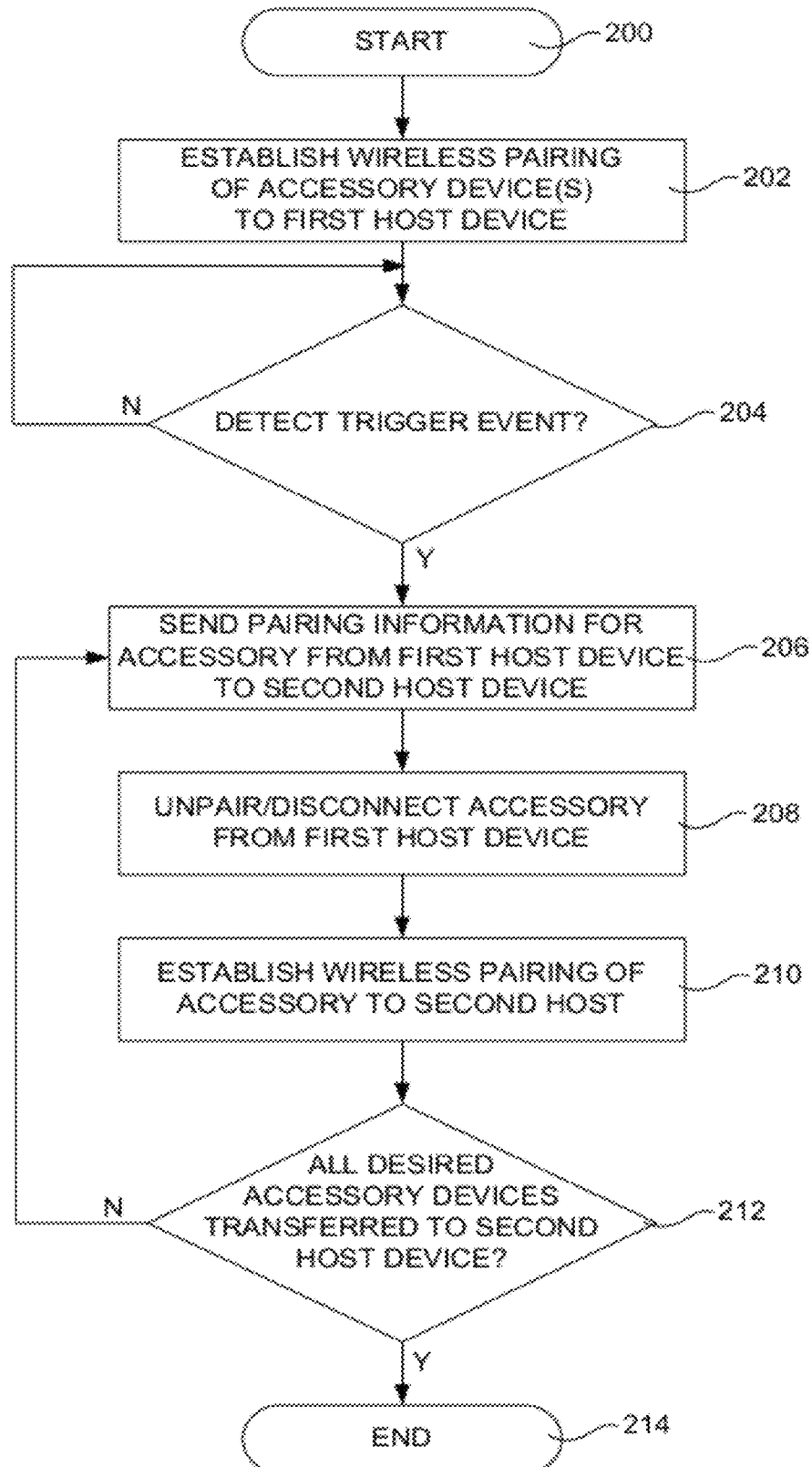
FIG. 3 provides a flowchart of an exemplary method of transferring a pairing between wireless devices according to one embodiment of the present invention.

Moving next to FIG. 3, a flowchart of an exemplary method of transferring a pairing between wireless devices is provided. It will be understood that the provided steps are shown only for purposes of illustration, and that many other steps may be included in the process, as may be desired. Furthermore, the order of steps may be changed where appropriate and not all steps need be performed in various instances. For example, step 202 may be performed well before the rest of the method, such that this step can be effectively omitted in some cases where the focus is solely on transferring control of an already long paired connection.

Beginning with a start step 200, a first process step 202 involves establishing a wireless pairing between one or more wireless accessory devices and a first host device. An inquiry is then made at subsequent decision step 204 as to whether a trigger event is detected. If not, then the process repeats until a trigger is detected, whereupon a paired host device transfer sequence begins. Pairing information for an accessory device is sent from the first host device to a second host device at process step 206, after which pairing control of the accessory device is transferred at steps 208 and 210. Step 208 involves the unpairing or disconnecting of the accessory device from the first host device, while step 210 involves establishing a wireless pairing of the accessory device to the second host device.

At a subsequent decision step 212 an inquiry is then made as to whether further accessory devices are to be transferred from the first host to the second host. If so, then the process reverts back to step 206, where pairing information for the next accessory device is sent to the second host device, wherein this step and the subsequent sequence repeats for every such accessory device. Once all accessory devices have been transferred to the second host device, then the process finishes at end step 214. Of course, various embodiments can involve the simultaneous or parallel processing of multiple accessory devices to be transferred between hosts rather than in series, as may be desired for a particular system and configuration.

Paired Host Device Selection

In many other situations, a user may be in a complex computing environment that includes multiple host devices, such as multiple desktop computers, laptops, tablets, cellular phones, servers and the like. In such a complex environment, it is highly inconvenient and cumbersome to have a separate wireless keyboard, mouse, pointer and other accessory for each different host device that could utilize such an accessory. Where fewer than the maximum number of wireless keyboards, for example, are present in such an environment, however, then events such as full power downs, other manual unpairings or disconnections, or the introduction of new wireless accessories can cause havoc with pairing to the desired host device. In such cases, it would be convenient to be able to readily pair an accessory device with any from a number of suitable host devices with little to no user interaction required.

Figure 4A:
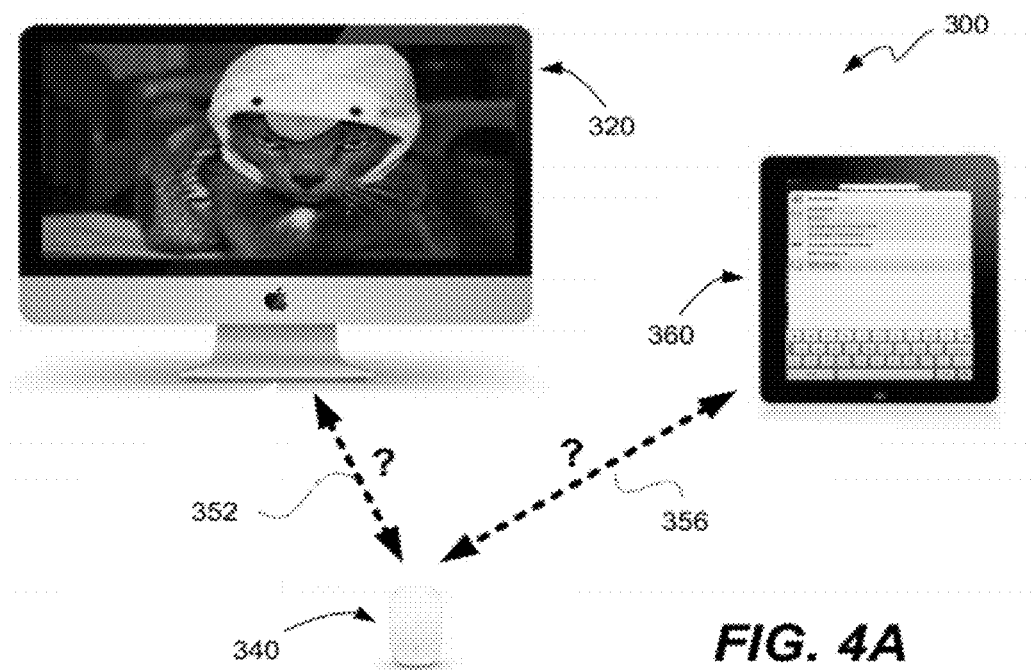
FIG. 4A illustrates in front facing view an exemplary system having multiple host devices and an accessory device adapted to pair with any of the multiple host devices according to one embodiment of the present invention.

Turning now to FIG. 4A, an exemplary system having multiple host devices and an accessory device adapted to pair with any of the multiple host devices is illustrated in front facing view. Wireless communications system 300 can be similar to system 100 set forth above, in that the system includes a first host device such as desktop computer 320, a second host device such as tablet computer 360, and one or more wireless peripherals or accessory devices such as wireless mouse 340, all devices of which are within wireless communications range of each other. As will be appreciated, additional host devices, accessory devices, or both may also be present and within wireless range of each other. However, a minimal number of devices are shown here for purposes of simplicity in illustration.

As shown, accessory device 340 is unpaired with any of the present host devices. A pairing along a potential wireless link 352 could be made with the first host device 320 or along a potential wireless link 356 to the second host device 360. Although numerous conventions may apply as to which host device 320, 360 the wireless accessory device 340 or devices will pair with, it is preferable that the accessory device or devices can be paired with any of the present host devices with as little user intervention as possible. Accordingly, accessory device 340 can be configured to selectively pair with a host device selected from multiple host devices based on a specific input such as a simple user gesture.

Figure 4B:
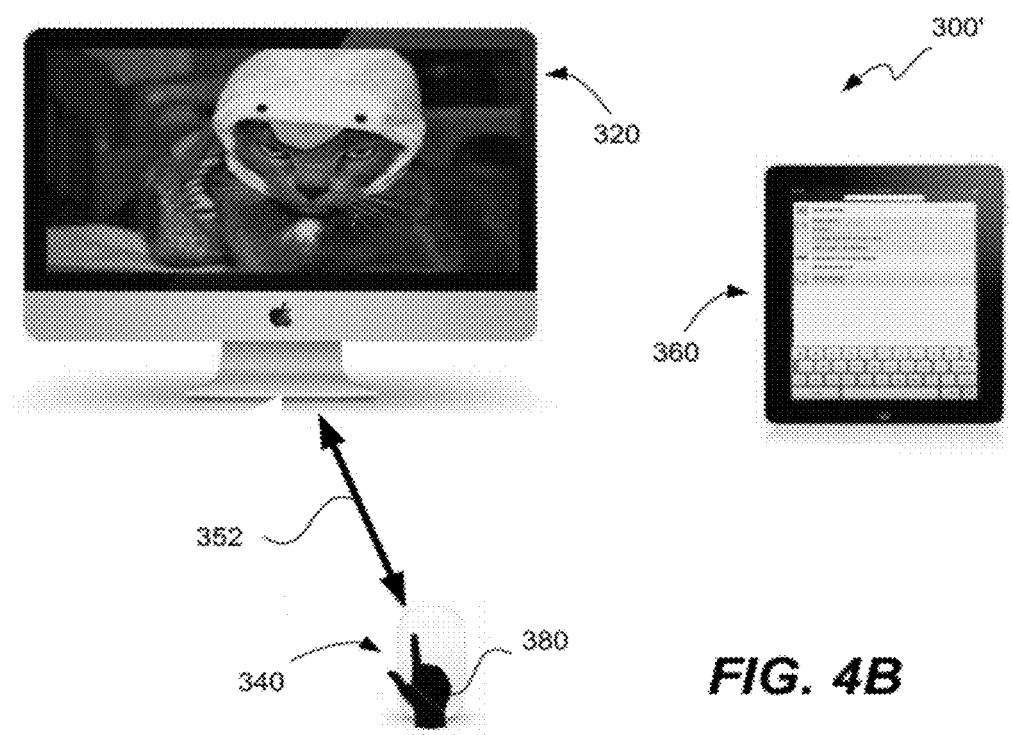
FIG. 4B illustrates in front facing view the exemplary system of FIG. 4A with a first user gesture being used at the accessory device to selectively pair with one of the host devices according to one embodiment of the present invention.

FIG. 4B illustrates in front facing view the exemplary system of FIG. 4A with a first user gesture being used at the accessory device to selectively pair with one of the host devices according to one embodiment of the present invention. Wireless system 300' has been modified in that the previously unpaired accessory device 340 has now been paired with first host device 320 along wireless link 352 as a result of a user gesture 380 detected at the accessory device. Such a user gesture can be, for example, a single button input, mouse click or other simple designated input at the accessory device during a pairing process. In this case, a single mouse click 380 at wireless mouse 340 results in the selection of first host device 320 for pairing with the mouse. Again, once a pairing to a particular host device 320 has been accomplished, a paired accessory device 340 is typically dedicated to that host device and will ignore the other host device 360 and any other host devices that may be present.

Where multiple suitable host devices are present, however, it is preferable that a particular user gesture be associated with each such host device. Thus, while a single mouse click may operate to initiate pairing of the wireless mouse 340 with the first host device 320, a different user gesture could operate to pair the mouse with the second host device 360. In the event that additional host devices are present, then a different user gesture could be used to result in pairing with each different host. In some cases, the different user gesture can be a completely different action or input, while in other cases it can be a repetition of the same action or input.

Figure 4C:
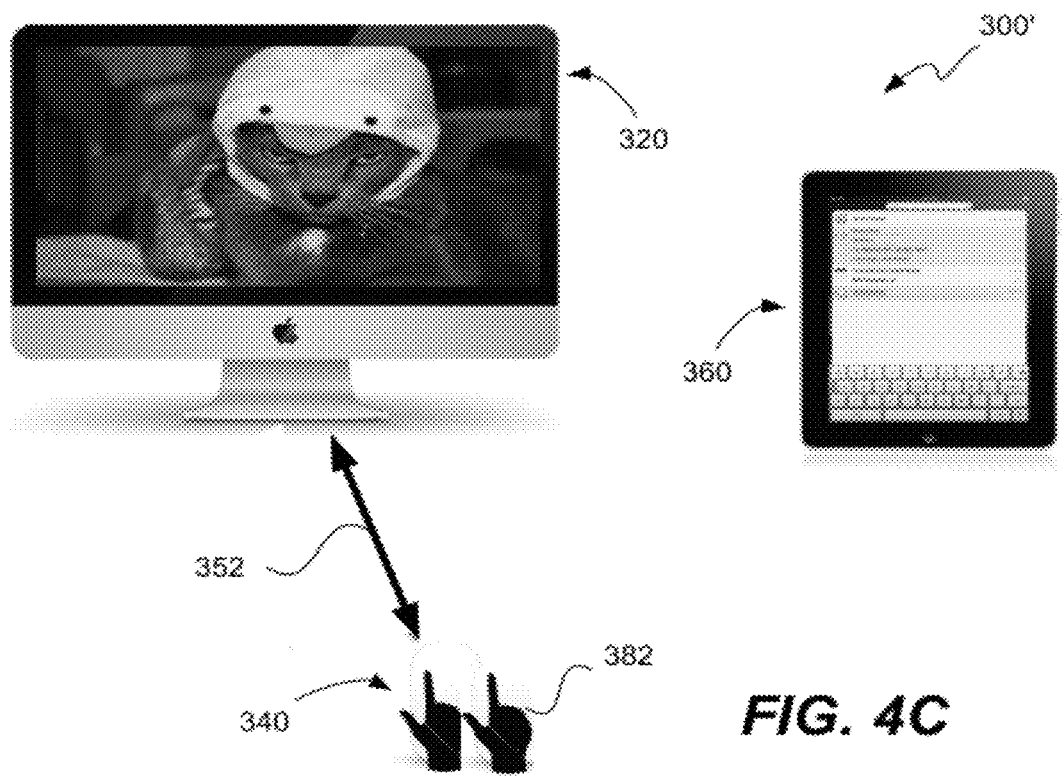
FIG. 4C illustrates in front facing view the exemplary system of FIG. 4B with a second user gesture being used at the accessory device to selectively pair another of the host devices according to one embodiment of the present invention.

Continuing with FIG. 4C, the exemplary system of FIG. 4B provides an example of such a second user gesture being used at the accessory device to selectively pair another of the host devices according to one embodiment of the present invention. Although wireless system 300' is shown as having the wireless mouse 340 being already paired with first host device 320, it will be readily appreciated that the same user gesture input and result could take place from other starting conditions, such as the unpaired condition set forth in FIG. 4A above or a condition where the mouse is paired with still another host device (not shown). As shown, a second user gesture 382 can involve a double mouse click at the wireless mouse 340, rather than a single mouse click. Such a second user gesture can be associated with the second host device 360 for purposes of pairing. In any event, a switching, pairing transfer or simple pairing establishment to the second host device can then take place in response to the second user gesture detected by the mouse.

Figure 4D:
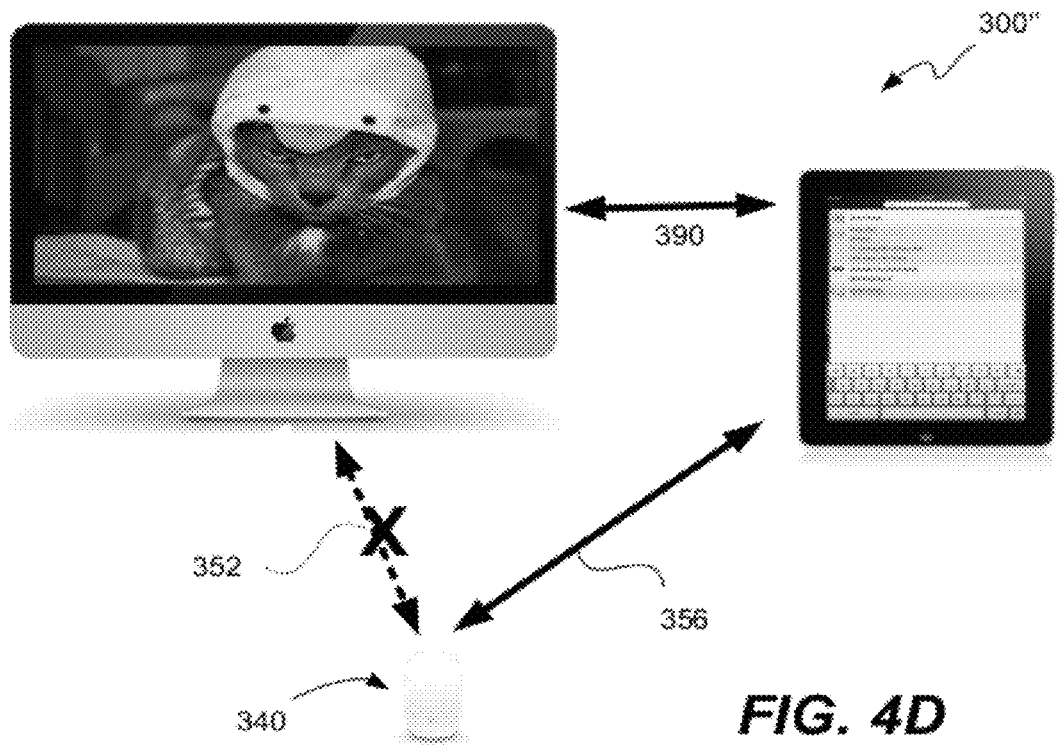
FIG. 4D illustrates in front facing view the exemplary system of FIG. 4C with the pairing arrangement being switched from one host device to the other host device according to one embodiment of the present invention.

FIG. 4D illustrates in front facing view the exemplary system of FIG. 4C with the pairing arrangement being switched from the first host device to the second host device. Such a switch can involve the unpairing or disconnecting of the mouse 340 from the first host device along wireless link 352, and the switched pairing/connecting of the mouse to the second host device along wireless link 356, resulting in newly configured wireless system 300". Additionally, such a switch can involve the first host device performing a transfer 390 of a unique link key to the second host device. As will be readily appreciated, a triple mouse click might be associated with a third host device (not shown), and so forth. Alternatively, a different type of user gesture can be used to differentiate between different host devices.

Thus, generic gestures can be repeated to cycle between some or all potential host devices, while specific different user gestures can be used to enable device pairing or switching in an even faster manner where possible. In addition to a mouse click or button push, other specific user gestures can also include an audible sound such as a clap or voice command, a hand motion or other physically recognizable user movement, or an acceleration of the accessory device itself, such as that which may be detectable by an internal accelerometer. In the event that an accelerometer and adequate sensing devices are used, specific user gestures may even include a sweeping motion toward the host device that is to be paired, for example.

In various embodiments, a given accessory device can maintain an internal list of suitable or previous host devices with associated pairing inputs. Such a list or table of host devices can be stored at a memory on the accessory device itself. In addition, a specific user gesture can be associated with each different possible host device, with this information also being stored on the accessory device internal memory. In such a manner, an appropriate user gesture input can then result in the more streamlined assigning or switching of a host device pairing for a given accessory device. Such an assigning or switching can involve entering a pairing mode and then detecting the proper host device with which to pair.

The pairing initiation process can place a wireless device to be paired in a pairing mode. For example, a wireless accessory device can be placed in a pairing mode by physical action with respect to the wireless accessory device. In one example, a button can be pressed on the wireless accessory device to cause the wireless accessory device to enter a pairing mode. Again, various different user inputs or gestures can be used to place a given accessory device into a pairing mode in the first place. Such inputs or gestures can be similar to or separate from the inputs or user gestures that are involved in assigning a desired host device for pairing, all of which can be configured on the accessory and host devices as needed.

In some embodiments, switching a given accessory device between multiple hosts can be specifically directed at the host level (e.g., from a first host to a second host as set forth above) or can be accomplished by cycling among a set user gesture or gestures in an order or type stored in the accessory device itself.

In some instances, one or more host devices can be "blacklisted" at least temporarily during a switching process, so as to facilitate more readily the switching and re-pairing process without an inadvertent pairing back to the original host device. Such a blacklisting can be temporary in nature, so as not to exclude the host device from the set of host devices among which an accessory can be paired in the future.

Figure 5:
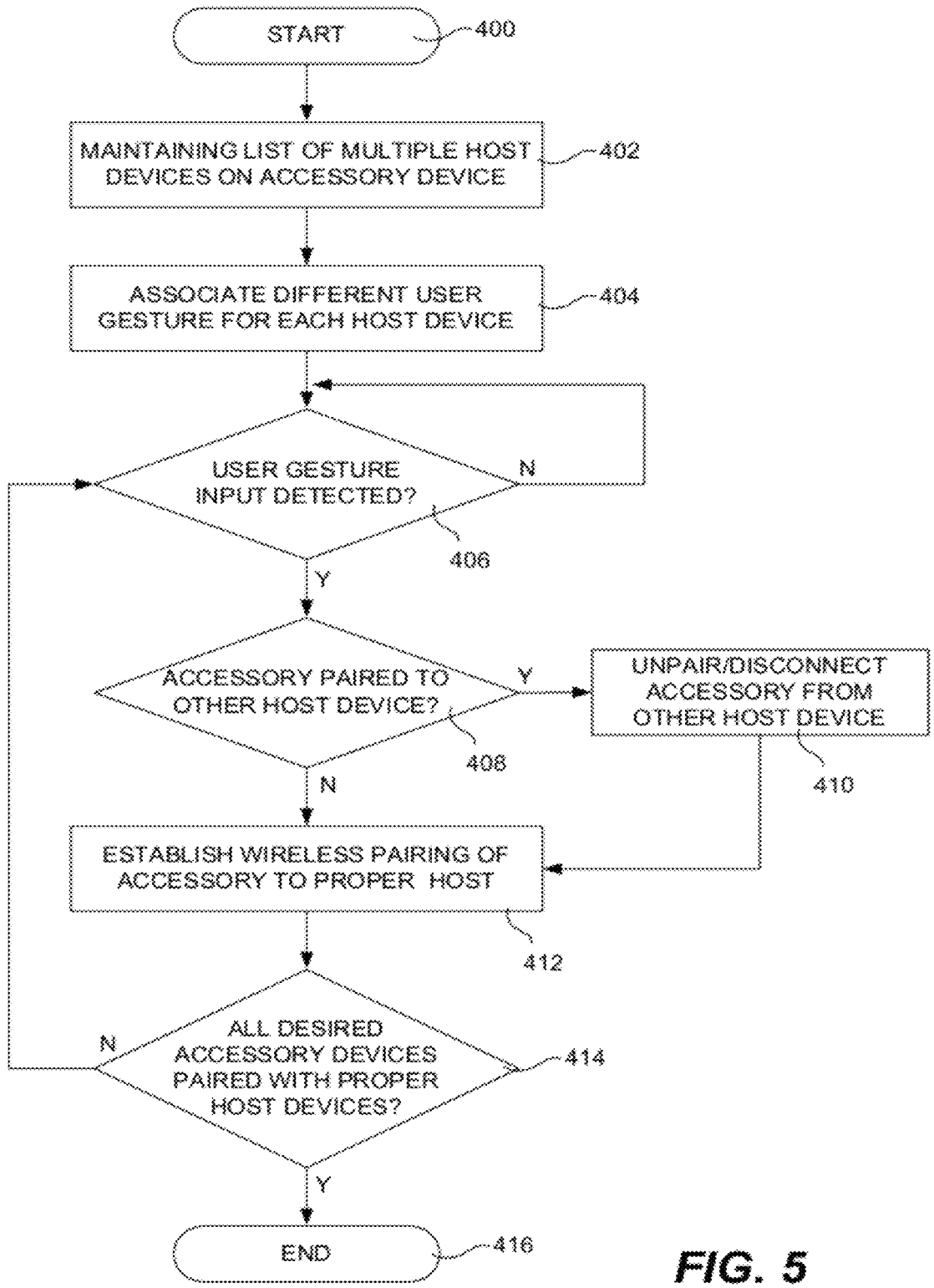
FIG. 5 provides a flowchart of an exemplary method of selecting one host device from multiple possible host devices for pairing according to one embodiment of the present invention.

Moving lastly to FIG. 5, a flowchart of an exemplary method of selecting one host device from multiple possible host devices for pairing is provided. Again, it will be understood that the provided steps are shown only for purposes of illustration, and that many other steps may be included in the process, as may be desired. Furthermore, the order of steps may be changed where appropriate and not all steps need be performed in various instances.

Beginning with a start step 400, a first process step 402 involves establishing and/or maintaining on a given accessory device a list of multiple suitable host devices. Again, such as list can be stored on an internal memory of the accessory. At subsequent process step 404, a different user gesture can be associated with each separate potential host device. Again, a user gesture can be a different thing for each different host device, or can involve a repeated gesture that then cycles between different potential host devices. A combination of these things can also be used. At following decision step 406, an inquiry is made as to whether a user gesture is detected at a given accessory device. If not, then the process repeats and waits until a user gesture is detected, upon which the method continues to decision step 408. At decision step 408, an inquiry is made as to whether the accessory device is already paired to another host device. If so, then the method continues to process step 410 where the accessory is then unpaired or disconnected from the other host device.

In either event, the method then continues to process step 412, where a wireless pairing is established between the accessory device and the proper host device that corresponds to the detected user gesture. At a following decision step 414, an inquiry is made as to whether all the desired accessory devices have been paired with the desired host device or devices. If not, then the method reverts to decision step 406, whereupon all intervening steps are then repeated for the next accessory device. Once all accessory devices have been paired with the proper desired host device or devices, then the method moves from decision step 414 to end step 416, where the method then ends.

The invention can be implemented by software, hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A method of a selecting a pairing automatically for a wireless accessory device to one of a plurality of possible host devices, comprising:
   maintaining in a memory of a wireless accessory device a list of multiple known host devices with which the accessory device is able to pair;
   associating a different user gesture input with each separate known host device in the list;
   detecting a first user gesture input by the accessory device, wherein the specific first user gesture includes a predetermined physical movement of the accessory device by a user, the predetermined physical movement including a sweeping motion with a direction towards one of a first and second host devices to be paired, which is detected by an accelerometer embedded within the accessory device;
   determining whether the accessory device is currently paired with a third host device;
   if so, unpairing the accessory device from the third host device; and
   establishing automatically a wireless pairing of the accessory device to the first host device associated with the detected first user gesture input in response to detecting the first user gesture, wherein said establishing occurs while the first host device and one or more other host devices are all within wireless communications range of the accessory device, wherein the accelerometer generates a signal to cause the accessory device to select and pair with one of the first and second host devices;
   wherein automatically establishing the wireless pairing comprises:
   temporarily blacklisting a set of host devices which includes the third host device but not the one of the first and second host devices to ensure that the accessory device selects and pairs with one of the first and second host devices;
   placing the accessory device into pairing mode.

2. The method of claim 1, wherein said establishing includes exchanging pairing information between the accessory device and the first host device, said pairing information including a link key that is unique to the accessory device.

3. The method of claim 1, further including the steps of:
   detecting a second user gesture input by the accessory device while the accessory device is paired with the first host device; and
   switching automatically the pairing of the accessory device from the first host device to a second host device associated with the second user gesture in response to detecting the second user gesture, wherein said switching occurs while the first host device and second host devices are both within wireless communications range of the accessory device.

4. The method of claim 3, wherein said switching includes:
   unpairing the accessory device from the first host device; and
   establishing a wireless pairing of the accessory device to the second host device.

5. A non-transitory computer readable medium for storing computer code executable by a processor of a wireless accessory device for selecting a pairing automatically of the accessory device to one of a plurality of possible host devices, comprising:
   computer code for maintaining in a memory of a wireless accessory device a list of multiple known host devices with which the accessory device is able to pair;
   computer code associating a different user gesture input with each separate known host device in the list;
   computer code for detecting a first user gesture input by the accessory device, wherein the specific first user gesture includes a predetermined physical movement of the accessory device by a user, the predetermined physical movement including a sweeping motion with a direction towards one of a first and second host devices to be paired, which is detected by an accelerometer embedded within the accessory device;
   computer code for determining whether the accessory device is currently paired with a third host device;
   computer code for unpairing the accessory device from the third host device if the accessory device is currently paired with the third host device: and
   computer code for establishing automatically a wireless pairing of the accessory device to the first host device associated with the detected first user gesture input in response to detecting the first user gesture, wherein said establishing occurs while the first host device and one or more other host devices are all within wireless communications range of the accessory device, wherein the accelerometer generates a signal to cause the accessory device to select and pair with one of the first and second host devices;
   wherein automatically establishing the wireless pairing comprises:
   temporarily blacklisting a set of host devices which includes the third host device but not the one of the first and second host devices to ensure that the accessory device selects and pairs with one of the first and second host devices;
   placing the accessory device into pairing mode.

6. The computer readable medium of claim 5, further including:
   computer code for detecting a second user gesture input by the accessory device while the accessory device is paired with the first host device; and
   computer code for switching automatically the pairing of the accessory device from the first host device to a second host device associated with the second user gesture in response to detecting the second user gesture, wherein said switching occurs while the first host device and second host devices are both within wireless communications range of the accessory device.

7. The computer readable medium of claim 6, wherein said computer code for switching includes:
   computer code for unpairing the accessory device from the first host device; and
   computer code for establishing a wireless pairing of the accessory device to the second host device.

* * * * *